United States Patent [19]

Schmidt et al.

[11] Patent Number: 4,920,181
[45] Date of Patent: Apr. 24, 1990

[54] POLYMERIC EMULSIFIERS BASED ON AMINO TELECHELATIC VINYL OLIGOMERS II

[75] Inventors: Adolf Schmidt, Cologne; Udo Hendricks, Odenthal; Bruno Bömer, Bergisch Gladbach; Karl-Heinz Ott, Leverkusen; Herbert Eichenauer, Dormagen; Alfred Pischtschan, Kuerten, all of Fed. Rep. of Germany

[73] Assignee: Bayer Aktiengesellschaft, Leverkusen, Fed. Rep. of Germany

[21] Appl. No.: 133,551

[22] Filed: Dec. 16, 1987

[30] Foreign Application Priority Data

Dec. 20, 1986 [DE] Fed. Rep. of Germany ....... 3643818

[51] Int. Cl.$^5$ .............................................. C08F 8/34
[52] U.S. Cl. .................. 525/327.5; 525/291; 525/344; 526/286; 526/287
[58] Field of Search ...................... 525/291, 327.5, 344; 526/286, 287

[56] References Cited

U.S. PATENT DOCUMENTS 3,795,647  7/1974  Ripley-Duggan .................. 523/375
4,490,308  12/1984  Fong et al. ......................... 526/286

FOREIGN PATENT DOCUMENTS 1347196  2/1974  United Kingdom .
1506653  4/1978  United Kingdom .

*Primary Examiner*—Bernard Lipman
*Attorney, Agent, or Firm*—Connolly and Hutz

[57] ABSTRACT

Sulphosuccinamide acids and their salts corresponding to the following general formula

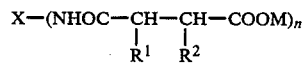

wherein
X denotes the residue of a hydrophobic, optionally branched vinyloligomer having an average molecular weight $\overline{M}_n$ of from 200-5,000, preferably from 300-3,000,
of the groups denoted by
$R^1 R^2$, one is hydrogen and the other is $-SO_3M$, and
n represents a number with a value of from 1.4-3.0, preferably form 1.6-2.3. and
M denotes hydrogen, an alkali metal, or an ammonium, $C_1$-$C_4$-alkyl-ammonium or $C_2$-$C_3$-hydroxy alkyl-ammonium group.

8 Claims, No Drawings

POLYMERIC EMULSIFIERS BASED ON AMINO TELECHELATIC VINYL OLIGOMERS II

The present invention relates to sulphosuccinamide acids and their salts corresponding to the following general formula

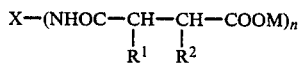

wherein
- X denotes the residue of a hydrophobic, optionally branched vinyl oligomer having an average molecular weight $\overline{M}n$ of from 200–5000, preferably from 300–3,000,
- of the groups denotes by
- $R^1$ and $R^2$, one is hydrogen and the other is $-SO_3M$,
- n represents a number with a value of from 1.4 to 3.0, preferably from 1.6 to 2.3, and
- M denotes hydrogen, an alkali metal, or an ammonium, $C_1$–$C_4$-alkyl-ammonium or $C_2$–$C_3$-hydroxy alkyl-ammonium group.

The invention also relates to the use of the compounds corresponding to formula I as surfactants and emulsifiers in aqueous systems.

The following are examples of the vinyl oligomers on which X is based.

Oligobutadienes and oligoisoprenes and the corresponding products having partially or completely hydrogenated double bonds, oligomers of ethylene, propylene or styrene, vinyl esters having from 2–4 carbon atoms in the carboxylic acid moiety, (cyclo)aliphatic esters of (meth)acrylic acid having from 1–12 carbon atoms in the alcohol moiety, triethoxyvinyl silane and trimethylvinylsilane.

Examples of M include sodium, potassium, ammonium, mono-, di- and trimethyl ammonium, mono-, di- and tri-(hydroxyethyl)-ammonium and mono- and di-(hydroxypropyl)-ammonium.

The compounds corresponding to formula I are prepared by known processes in which vinyl oligomers containing amino end groups and corresponding to the formula

  II, wherein
- X and n have the meanings indicated above are reacted with maleic acid anhydride at temperatures of 20°–120° C., preferably from 40° to 70° C. and optionally in the presence of inert solvents, in a molar ratio of at least 1:n, and the resulting reaction products are then reacted with alkali metal or ammonium sulphites.

The vinyl oligomers containing amino end groups as represented by formula II, hereinafter referred to as aminotelechelatic vinyloligomers, are known compounds.

Suitable amino telechelatic oligomers include, for example, products described in DOS 2 151 848 in so far as they are insoluble in water, amino telechelatic oligopropylenes, oligobutadienes, and oligoisoprenes and amino telechelatic oligobutadienes and oligoisoprenes in which the double bonds are partially or completely hydrogenated.

The preparation of such amino telechelatic vinyl oligomers is known. It is carried out by the polymerisation of vinyl monomers, using large quantities of nitrile-containing aliphatic azo initiators, to form vinyl oligomers containing nitrile end groups, which oligomers are converted into amino telechelatic vinyl oligomers of formula II by catalytic hydrogenation of the nitrile end groups to primary amino groups.

US-P 2 561 068, for example, describes inter alia the preparation of low molecular weight polybutadienes, polyisoprenes and polypropylenes containing approximately two nitrile end groups by batch polymerisation of the corresponding monomers with large quantities of nitrile-containing aliphatic azo initiators.

The catalytic hydrogenation of the nitrile end groups of such products to primary amino groups has been described in US-P 2 647 146. The waxy consistency of the diamine prepared in Example 2 of the said application is an indication of at least partial hydrogenation of the double bonds of the oligobutadiene.

The preparation of nitrile telechelatic oligobutadienes or oligoisoprenes is preferably carried out continuously in a flooded stirrer autoclave at pressures below 25 bar. The molecular weight of the oligomers may be adjusted by the ratio of azodinitrile initiator to monomer. The following are examples of suitable azodinitrile initiators: 2,2'-azo-bis-isobutyronitrile (AIBN), 2,2'-azo-bis-2-methyl-butyronitrile, 1,1'-azo-dicyclopentane-carbonitrile, 1,1'-azo-dicyclohexane-carbonitrile, 2,2'-azo-bis-cyclopentylpropionitrile, 1,1'-azo-dicampher-carbonitrile, 2,2'-azo-bis($\alpha,\gamma$-dimethyl-valeronitrile), 2,2'-azo-bis-2-phenylpropionitrile, 2,2'-azo-bis-2-benzyl-propionitrile and 2,2'-azo-bis-2-(4-methoxyphenyl)-propionitrile.

AIBN, 2,2'-azo-bis-2-methyl-butyronitrile and 2,2'-azo-bis($\alpha,\gamma$-dimethyl-valero nitrile) are preferred initiators.

When AIBN is used as initiator, the preferred polymerisation temperatures are from 90° to 130° C. and the average dwell times from 1–6 hours.

Suitable nitrile telechelatic oligobutadienes and oligoisoprenes may, of course, also be prepared discontinuously by an inflow process. Hydrogenation of the nitrile end groups is carried out in a known manner by catalytic hydrogenation of the olgiomer dissolved in a solvent such as toluene. Raney cobalt, for example, is suitable for the selective hydrogenation of the nitrile groups, and the formation of secondary and tertiary amino groups may be supressed by an addition of $NH_3$.

The $H_2$ pressure is preferably from 100–200 bar and the hydrogenation temperature from 100°–200° C. If the hydrogenation times are very long or Raney nickel is added to the Raney cobalt, then the C-C double bonds of the oligobutadienes or oligoisoprenes may also be hydrogenated.

The preparation of amino telechelatic oligostyrenes, amino telechelatic oligoethylenes and aminotelechelatic oligoacrylic acid ethyl esters, and of an amino telechelatic oligomethacrylic acid methyl ester, an amino telechelatic oligomethacrylic acid ethyl ester and an amino telechelatic oligovinyl acetate are described in the Examples of DOS 2 151 848. Preparation of the nitrile telechelatic preliminary products is carried out by the processes according to DOS 2 030 589. The preparation of dinitrile telechelatic oligostyrenes has also been described in detail by Konter, Bömer, Köhler and Heitz in Makromol, Chem. 182 (1981), 2619–2632.

Suitable solvents for the reaction of the amino telechelatic vinyl oligomers of Formula II with maleic acid anhydride include, for example, aliphatic and aromatic hydrocarbons, in particular toluene and xylene, aliphatic and aromatic halogenated hydrocarbons such as methylene chloride, ethylene chloride and chlorobenzene, esters and ketones, e.g. ethyl acetate and acetone, and ethers, e.g. tetrahydrofuran.

The amino telechelatic vinyl oligomers are preferably dissolved in the solvents and the maleic acid anhydride is added to the resulting solutions at the selected reaction temperature.

The ratios of the components are selected to provide at least one equivalent of maleic acid anhydride to each amine equivalent of the amino telechelatic vinyl oligomers but maleic acid anhydride may be added in a slight excess.

For the reaction of the maleic acid anhydride reaction products with the alkali metal or ammonium sulphite, the quantity of alkali metal or ammonium sulphite is chosen to provide from 0.95–1.05 mol of alkali metal or ammonium sulphite per mol of maleic acid anhydride put into the process.

The polymeric emulsifiers are used in quantities of from 0.2 to 20% by weight, preferably from 1 to 10% by weight, based on the quantity of monomers.

These emulsifiers are suitable, for example, for the emulsion polymerisation of butadiene, isoprene, chloroprene, styrene and styrenes which are substituted in the aromatic nucleus, α-methyl styrene, (meth)acrylic acid esters having from 1–20 carbon atoms in the alcohol moiety, vinyl esters having from 2 to 10 carbon atoms in the carboxylic acid moiety, ethylene, vinyl chloride, vinylidene chloride, acrylonitrile and methacrylonitrile and combinations of the above mentioned monomers suitable for emulsion copolymerisation. Minor quantities (about 0.1 to 10% by weight) of (meth)acrylic acid, (meth)acrylamide, maleic acid, itaconic acid, vinyl sulphonic acid, methallyl sulphonic acid, vinyl phosphonic acid or acrylamido-2-methyl-propane sulphonic acid (AMPS) may also be incorporated for additional stabilization of the emulsions. The polymeric emulsifiers according to the invention are preferably used for the polymerisation of butadiene, isoprene and chloroprene, and for the copolymerisation of butadiene-styrene, butadiene-acrylonitrile, ethylene-vinyl acetate, ethylene-vinyl chloride, styrene, butylacrylate and styrene-acrylonitrile.

For the preparation of polybutadiene latices, which are particularly suitable for use as graft stocks for the preparation of impact resistant thermoplasts of the ABS type, it is (particularly) preferred to use polymeric emulsifiers in which the residue X consists of polybutadiene, polyisoprene or polyisoprene or polybutadiene, in which the double bonds are partially or comletely hydrogenated.

EXAMPLES OF PREPARATION 1-4

Polymerisation of butadiene and isoprene

A 6 liter stirrer autoclave equipped with pressure retaining valve is completely filled with toluene and heated to a reaction temperature of 120° C. At this temperature, the quantities indicated in the table of liquid butadiene or isoprene and of a toluene solution containing 40 g of azo-isobutyric acid nitrile (AIBN) per liter are pumped in per hour.

The pressure retaining valve is adjusted to 16–18 bar. After a starting up phase of 8 hours, the solution discharged from the autoclave is freed from residual monomer and concentrated by evaporation under vacuum.

| Example of preparation number | 1 | 2 | 3 | 4 |
|---|---|---|---|---|
| Butadiene (ml/h) | 750 | 1500 | — | — |
| Isoprene (ml/h) | — | — | 750 | 1500 |
| AIBN solution (ml/h) | 2250 | 1500 | 2250 | 1500 |
| Yield (g/h) | 360 | 580 | 385 | 630 |
| Nitrogen content (%) | 4.0 | 1.6 | 3.9 | 1.6 |
| $M_n$ from N | 700 | 1750 | 720 | 1750 |
| $M_n$ from vapour pressure osmosis in toluene | 730 | 1680 | 750 | 1790 |

EXAMPLES OF PREPARATION 5–8

Preparation of the amino telechelatic oligomers by hydrogenation of the nitrile end groups.

750 g of dinitrile telechelatic oligomer, 2000 ml of toluene, 375 ml of liquid ammonia and 75 g of Raney cobalt are introduced into a 4 liter autoclave and hydrogenated at 200° C. and a hydrogen pressure of 100 bar for 10 hours.

The toluene is removed under vacuum after removal of the catalyst by filtration.

| Example of preparation number | 5 | 6 | 7 | 8 |
|---|---|---|---|---|
| Oligobutadiene from Example number | 1 | 2 | — | — |
| Oligoisoprene from Example number | — | — | 3 | 4 |
| Yield (g) | 740 | 730 | 755 | 725 |
| Total nitrogen (%) | 3.9 | 1.5 | 3.7 | 1.55 |
| Basic nitrogen (%) | 3.2 | 1.49 | 3.5 | 1.55 |
| Primary nitrogen (%) | 2.9 | 1.45 | 3.3 | 1.45 |
| Secondary nitrogen (%) | 0.2 | 0.03 | 0.15 | 0.08 |
| Tertiary nitrogen (%) | 0.1 | 0.01 | 0.05 | 0.02 |
| $M_n$ from total N | 740 | 1870 | 760 | 1800 |

EXAMPLE 9

360 parts of an aminotelechelatic oligobutadiene, prepared according to example of preparation 5 (basic nitrogen 3.2%, $\overline{M}_n$ 740) were dissolved in 350 parts of toluene, and 87 parts of maleic acid anhydride were added portionwise at 50°–60° C. and the mixture was stirred for one hour at 60°–70° C. After removal of the toluene by distillation under vacuum, 447 parts of a viscous, dark brown residue with acid number 114 mg KOH/g were obtained. The IR spectrum showed the presence of an acid amide group. A solution of 113 parts of sodium sulphite in 810 parts of water was added to the evaporation residue at 60°–70° C. and stirring was continued at the same temperature for 7 hours. The aqueous solution obtained was stirred at the same temperature. The aqueous solution was then clarified by filtration with the addition of keiselguhr. A clear, brownish solution having a dry content of 40% which dissolved to form a clear solution in water was obtained.

The evaporation residue obtained by 3 hours heating in a vacuum at 100° C. had a nitrogen content of 2.4% and a sulphur content of 5.2%.

EXAMPLE 10

120 parts of an amino telechelatic oligobutadiene prepared according to example of preparation 6 (basic nitrogen 1.49%, $\overline{M}_n$ 1870) were reacted with 14 parts of maleic acid anhydride in toluene as described in Example 9. The acid number of the reaction product after evaporation was 59.7 mg KOH/g. The evaporation residue was dissolved with 90 parts of isopropanol, a solution of 18.9 parts of sodium sulphite in 100 parts of water was added at 50°–60° C., and the reaction mixture was stirred at 60°–70° C. for 3 hours. The isopropanol was then removed by evaporation under vacuum. A viscous, whitish emulsion having a dry content of 45% which yielded an opalescent solution in water was obtained.

EXAMPLE 11

120 parts of an amino telechelatic oligoisoprene, prepared according to example of preparation 8 (basic nitrogen 1.55% $\overline{M}_n$ 1800) were reacted with 14.7 parts of maleic acid anhydride in toluene as described in Example 9. The acid number of the reaction product after evaporation was 63.1 mg KOH/g. The evaporation residue was dissolved with 60 parts of ethanol and 60 parts of 10% sodium hydroxide solution, and 43 parts of a 36.3% aqueous sodium hydrogen sulphite solution were then added at 50° to 60° C. After the addition of 100 parts of water, the reaction mixture was stirred for 3 hours at 70°–80° C. Ethanol was then removed by evaporation under vacuum. A white paste having a dry content of 73% which yielded an emulsion type of solution in water was obtained.

EXAMPLE 12

360 parts of an aminotelechelatic oligoisoprene prepared according to example of preparation 7 (basic nitrogen 3.5% $\overline{M}_n$ 760) were reacted with 96.9 parts of maleic acid anhydride as described in example 9. The acid number of the reaction product after evaporation was 115 mg KOH/g. A solution of 132 parts of sodium sulphite in 690 parts of water was added to the evaporation residue and the mixture was stirred at 60°–70° C. for 7 hours. The aqueous solution obtained was clarified by filtration with the addition of kieselguhr. A brownish, clear solution having a dry content of 45% which dissolved to form a clear solution in water was obtained.

The evaporation residue obtained by 3 hours heating under vacuum at 100° C. had a nitrogen content of 2.2.% and a sulphur content of 5.6%.

EXAMPLES 13–16

General method of polymerisation.

The following were introduced with exclusion of atmospheric oxygen into a 6 liter autoclave equipped with flat blade agitator (150 revs. per min) and external heating jacket with reaction temperature control:

| | |
|---|---|
| Deionized water | 1850 g |
| Polymer emulsifier, 10% aqueous solution | 640 g |
| Tert.-dodecylmercaptan | 5 g |
| 4,4'-azo-bis-(4-cyanopentanoic acid potassium) | 5 g |
| Dissolved in deionized water | 80 g |
| Butadiene | 1600 g |

The autoclave contents are heated to a reaction temperature of 65° C. and maintained at this temperature until the pressure has fallen from about 7 bar to about 1.5 bar. The autoclave pressure is slowly released at the top, the butadiene which escapes is removed and the latex is discharged and subsequently demonomerized by distilling off about 10% of the water contained in the latex and replacing it with fresh water.

| Example number | Emulsifier of example number | Solids (% by weight) | Precipitate (g) | Particle size$^{(a)}$ (nm) | Outflow time$^{(b)}$ (sec) | Electrical conductivity (ms) |
|---|---|---|---|---|---|---|
| 13 | 9 | 42.5 | none | 69 | 36 | 4.7 |
| 14 | 10 | 35 | −36 | 98 | 16.5 | 1.4 |
| 15 | 11 | 40 | 25 | 100 | 20.7 | 2.1 |
| 16 | 12 | 38.4 | 6 | 60 | 30.2 | 3.2 |

$^{(a)}$Determined by turbidity measurement (corresponds to $D_{AV}$ see DIN 53 206)
$^{(b)}$Outflow cup according to DIN 53 211, 4 mm nozzle at 25° C.

EXAMPLES 17 AND 18

Graft polymerisation of styrene/acrylonitrile mixtures on the polybutadiene latices prepared according to examples 14 and 16.

50 parts of polybutadiene (the polybutadiene latex from example 14 or 16 adjusted to a solids content of 25% by weight after dilution with water) are heated to 65° C. under nitrogen. 0.5 parts by weight of potassium persulphate (dissolved in 15 parts by weight of water) are then added. A mixture of 36 parts by weight of styrene and 14 parts by weight of acrylonitrile and 2 parts by weight of the sodium salt of disproportionated abietic acid (dissolved in 25 parts by weight of water) is then added over a period of 4 hours to effect the grafting reaction.

| Example number | Latex from Example number | Emulsifier from Example number | Precipitate (%) |
|---|---|---|---|
| 17 | 14 | 10 | 0 |
| 18 | 16 | 12 | 0.18 |

The latex is coagulated with a magnesium sulphate/acetic acid solution and the resulting powder is dried under vacuum at 70° C.

EXAMPLES 19 AND 20

Testing of mixtures of the graft polymers described in examples 17 and 18 with a styrene/acrylonitrile copolymer 40 parts by weight of the graft polymer described under examples 17 and 18 were mixed with 60 parts by weight of a styrene/acrylonitrile resin (72:28; $M_w$ about 115,000; $M_w/M_n - 1 \leq 2$), 2 parts by weight of ethylene diamino-bis-stearylamide and 0.1 parts by weight of a silicone oil are mixed in an internal kneader and then made up into plates measuring $40 \times 60 \times 2$ by injection moulding. The plates were assessed for their intrinsic colour and surface gloss, the gloss being assessed on the A-H scale according to DE-AS2420 358.

| Example | Processing temperature | Intrinsic color | Gloss stage |
|---|---|---|---|
| 19 | 240° C. | light | E |
| | 260° C. | light | E |
| | 280° C. | yellow | E-F |
| 20 | 240° C. | light | D |
| | 260° C. | light | E |
| | 280° C. | light | E |

We claim:
1. Sulphosuccinamide acids and their salts corresponding to the formula

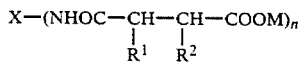

wherein
- X denotes the residue of a hydrophobic vinyloligomer having an average molecular weight $\overline{M}_n$ of from 200–5,000,
- one of $R^1$ and $R^2$ is hydrogen and the other is $-SO_3M$,
- n represents a number with a value of from 1.4–3.0, and
- M denotes hydrogen, an alkali metal, ammonium, $C_1$-$C_4$-alkylammonium, or $C_2$-$C_3$-hydroxy alkylammonium.

2. Sulphosuccinamide acids and their salts according to claim 1 wherein the vinyloligomer X has an average molecular weight $\overline{M}_n$ of from 300 to 3,000 and n represents a number with a value from 1.6 to 2.3.

3. Sulphosuccinamide acids and their salts according to claim 1 wherein the vinyloligomer X is an oligomer of ethylene, propylene, butadiene, isoprene, styrene, vinyl esters having 2–4 carbon atoms in the carboxylic acid moiety, (cyclo)aliphatic esters of (meth)acrylic acid, triethoxyvinyl silane or trimethylvinyl silane.

4. Sulphosuccinamide salts according to claim 3 wherein X represents the residue of an oligomeric butadiene or isoprene and M represents sodium.

5. Sulphosuccinamide acids and their salts corresponding to the formula

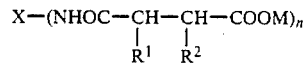

wherein
- X denotes the residue of a hydrophobic, oligopropylenes, oligobutadienes or oligoisoprenes having an average molecular weight $\overline{M}_n$ of from 200–5,000,
- one of $R^1$ and $R^2$ is hydrogen and the other is $-SO_3M$,
- n represents a number with a value of from 1.4–3.0, and
- M denotes hydrogen, an alkali metal, ammonium, $C_1$-$C_4$-alkylammonium, or $C_2$-$C_3$-hydroxy alkylammonium.

6. Sulphosuccinamide acids and their salts according to claim 5 wherein X is partially or completely hydrogenated.

7. Sulphosuccinamide acids and their salts according to claim 5 wherein X has an average molecular weight $\overline{M}_n$ of from 300 to 3,000 and n represents a number with a value from 1.6 to 2.3.

8. Sulphosuccinamide salts according to claim 5 wherein X represents oligobutadiene or oligoisoprene and M represents sodium.

* * * * *